US007712364B2

(12) United States Patent
Radhakrishnan et al.

(10) Patent No.: US 7,712,364 B2

(45) Date of Patent: May 11, 2010

(54) FLUID LEVEL MEASURING DEVICE FOR A BEVERAGE DISPENSER

(75) Inventors: Suresh Radhakrishnan, Springfield, IL (US); Scott Allan Woods, Delavan, WI (US); Scott Biba, Highland, WI (US)

(73) Assignee: Bunn-O-Matic Corporation, Sprinfield, IL (US)

(*) Notice: Subject to any disclaimer, the term of this patent is extended or adjusted under 35 U.S.C. 154(b) by 133 days.

(21) Appl. No.: 11/577,164

(22) PCT Filed: Oct. 13, 2005

(86) PCT No.: PCT/US2005/037225

§ 371 (c)(1),
(2), (4) Date: Oct. 22, 2007

(87) PCT Pub. No.: WO2006/044782

PCT Pub. Date: Apr. 27, 2006

(65) Prior Publication Data

US 2009/0031798 A1 Feb. 5, 2009

Related U.S. Application Data

(60) Provisional application No. 60/618,887, filed on Oct. 14, 2004.

(51) Int. Cl.
*G01F 23/26* (2006.01)

(52) U.S. Cl. .................................................... 73/304 C

(58) Field of Classification Search ................ 73/304 C
See application file for complete search history.

(56) References Cited

U.S. PATENT DOCUMENTS

| | | | | |
|---|---|---|---|---|
| 2,354,945 | A | 8/1944 | Cohen et al. | |
| 4,176,553 | A | 12/1979 | Wood | |
| 4,433,577 | A | 2/1984 | Khurgin et al. | 73/290 |
| 6,505,509 | B2 | 1/2003 | Gualtieri | 73/290 |
| 6,539,797 | B2 | 4/2003 | Livingston et al. | 73/304 |
| 6,741,180 | B2 | 5/2004 | Lassota | 304/622 |
| 7,401,513 | B2 | 7/2008 | Szela et al. | 73/304 |
| 2002/0145527 | A1 | 10/2002 | Lassota | |
| 2004/0199131 | A1 * | 10/2004 | Kitamura | 604/318 |

* cited by examiner

*Primary Examiner*—Hezron Williams
*Assistant Examiner*—Rodney T Frank
(74) *Attorney, Agent, or Firm*—Barnes & Thornburg LLP

(57) ABSTRACT

A level sensing apparatus and method of use for use with a beverage server to indirectly sense the level of beverage retained in the server. The server having a body for receiving and retaining beverage with an opening in the body for receiving the level sensing apparatus and beverage there through. The level sensing apparatus includes at least one capacitive sensing probe assembly retained in a housing to separate the probe assembly from contact with beverage. The housing containing the capacitive sensing probe assembly being disposable into the opening in the body of the server. The capacitive sensing probe indirectly sensing at least one level of beverage retained in the beverage server. A separate display assembly is provided and selectively couplable to the capacitive sensing probe assembly. A power source is provided and coupled to the display assembly and to the capacitive sensing probe assembly to provide power to sense and display the level of beverage in the server.

27 Claims, 12 Drawing Sheets

FIG. 4
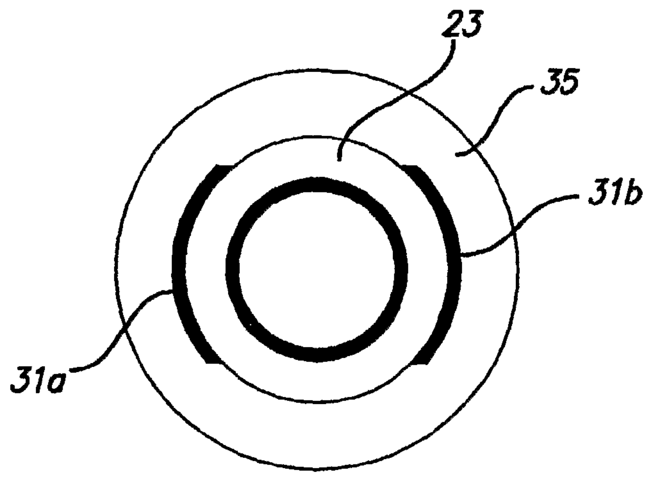
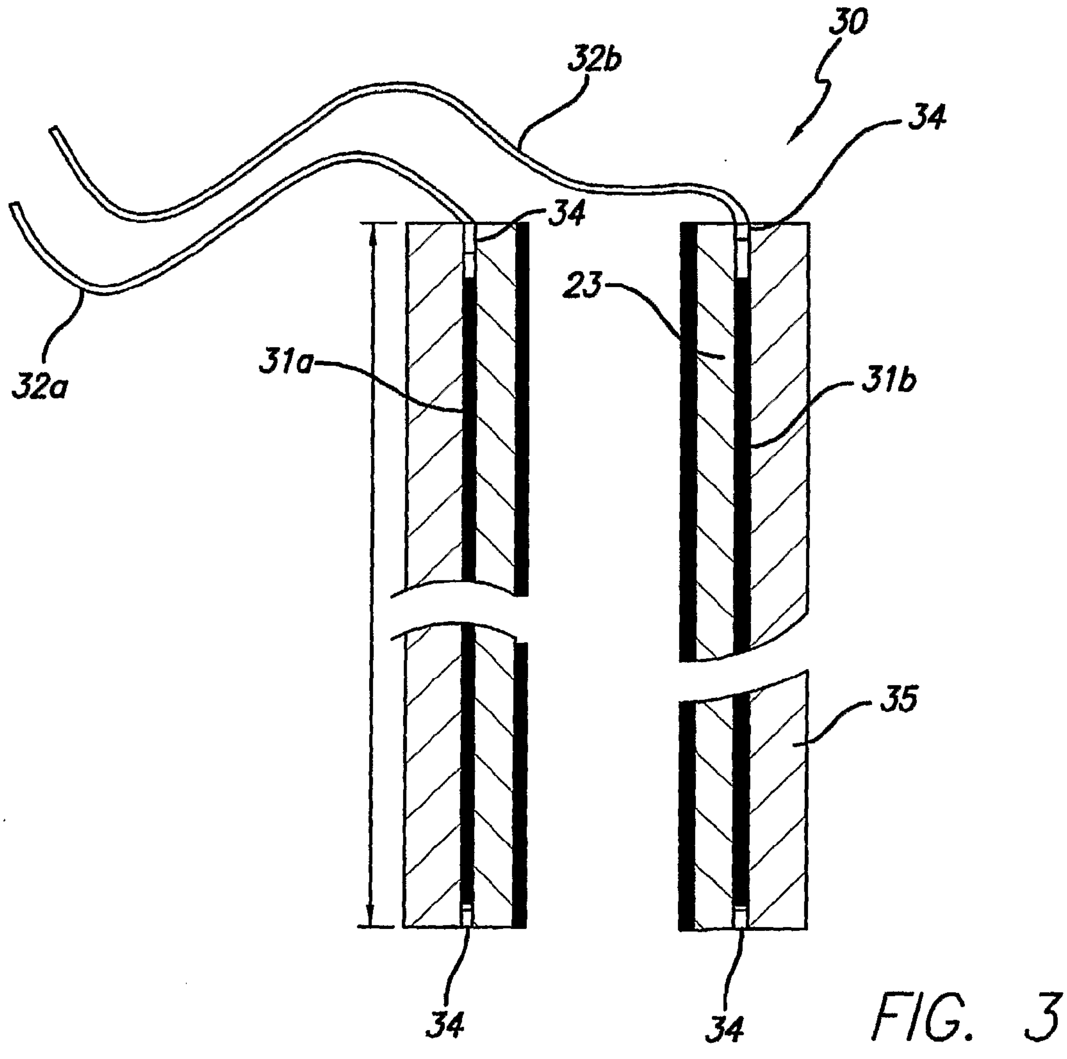
FIG. 3

FLUID LEVEL MEASURING DEVICE FOR A BEVERAGE DISPENSER

CROSS-REFERENCE TO RELATED PATENT APPLICATION

This patent application claims the benefit of U.S. Provisional Patent Application No. 60/618,887, filed Oct. 14, 2004. The disclosure set forth in the referenced provisional application is incorporated herein by reference in its entirety, including all information as originally submitted to the United States Patent and Trademark Office.

BACKGROUND

This invention relates to beverage servers or dispensers, particularly coffee servers used in a commercial or food service environment.

Beverage dispensers, such as coffee servers, are well known in the commercial food service industry. The servers of the prior art generally include a refillable tank for holding coffee or other beverage, a heating element for keeping the beverage at a desired temperature, a valve or faucet located at the bottom of the tank for selectively dispensing the coffee, and a sight glass or tube mounted on the exterior of the tank and in fluid communication with the interior of the server for determining the level of coffee in the server.

The sight glass or tube used in the prior art, while simple in construction and operation, is not without some disadvantages. The sight tube is arranged so that it is in fluid communication with the beverage in the tank, and is generally placed vertically on the front of the server extending upward from the faucet used to dispense the coffee. Because the sight glass extends from the faucet, the coffee drawn by the user is a blend of coffee from the sight tube and the tank. Because the sight tube is located outside of the body of the server and hence the tank, the sight tube is not insulated. As a result, the coffee dispensed from the sight tube may be at a temperature lower than the rest of the tank, and hence lower than a coffee drinker might like. The sight tube can also become stained from contact with the coffee, and further coated by oils and other residue present in the coffee. This may lead to undesired tastes being imparted to the coffee or an undesirable cosmetic appearance on the sight gauge. The stains and residues can be cleaned, however this requires complete disassembly of the coffee urn and sight tube, which results in added expense and down time.

To avoid these and other problems, it is desirable to eliminate the sight tube, yet still retain the capability of readily displaying the level of coffee in the server to the user or food service personnel monitoring the server. To address these problems, the invention herein describes a capacitance probe placed within the tank, whereby the level of coffee is detected by the change in capacitance sensed by the probe. The electronic signal generated by the probe can then be used to drive a display, such as an analog level meter, or a digital display, thereby allowing food service personnel to monitor the level of coffee or other beverage in the server.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which:

FIG. 3 is a cross sectional view of a capacitance probe.

FIG. 4 is a top sectional view of a capacitance probe.

Figure 1:
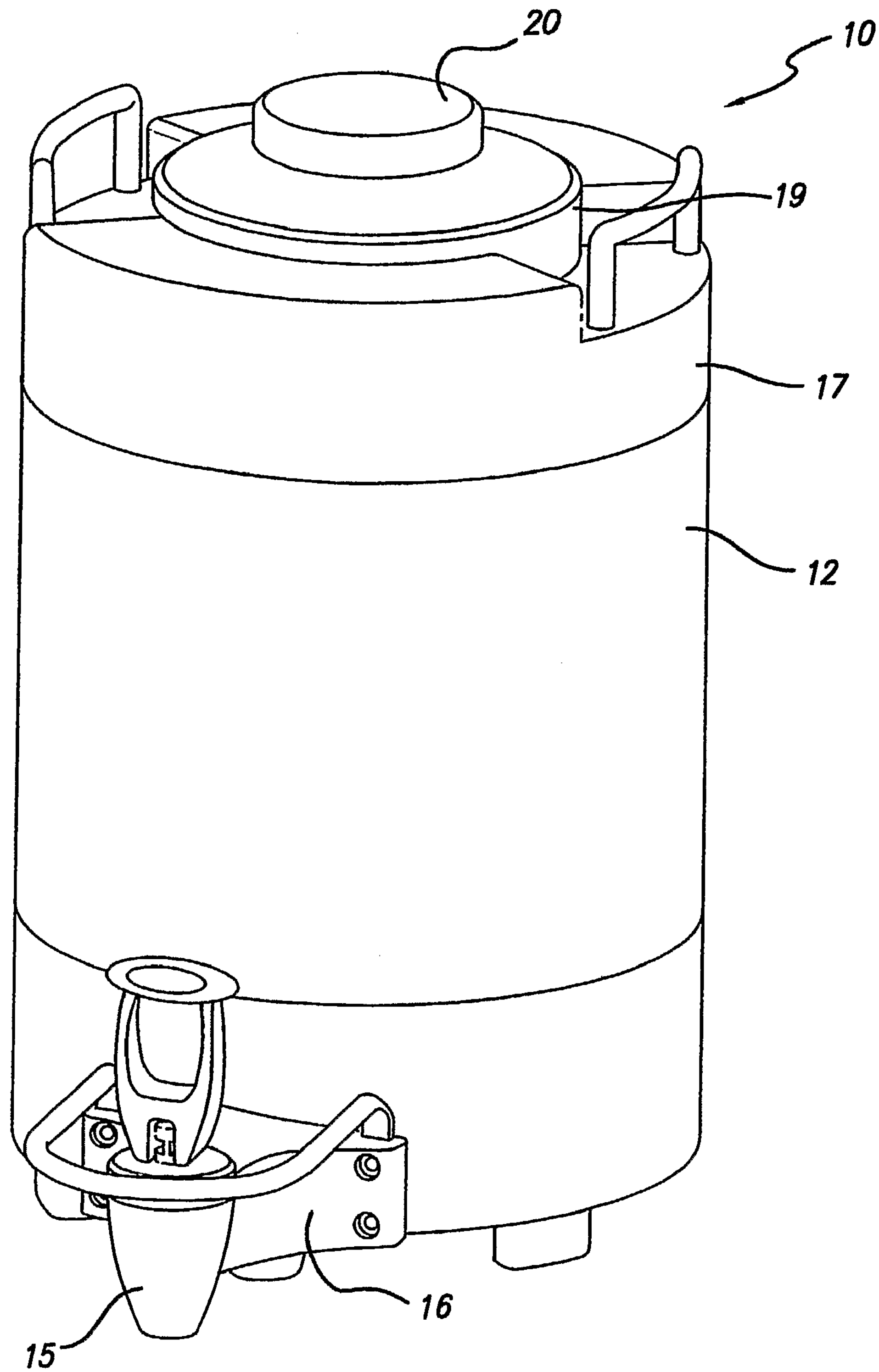
FIG. 1 is a perspective view of a beverage dispenser.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

The Figures provide a variety of diagrammatic illustrations relating to the present disclosure. All these illustrations are intended for use with a heated water system and more particularly may be used with a heated water system which is used for producing a brewed beverage. It should be understood that the present disclosure is not limited to the system, but is intended to be broadly interpreted to include all applications such as described in detail herein and which might be developed based on the disclosure provided herein.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated is used to distinguish from the term unheated such that unheated water is generally introduced into the reservoir during the brewing cycle. In or near the reservoir the water is heated resulting in heated water.

Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is intended to include, without limitation, at least funnel and filter-type, packet or pouch-type, pod-type or other prepackaged or unpackaged forms of retaining and brewing a beverage or making of a food product. The terms heated water may be interpreted as hot water, and generally refers to adding energy to water to heat the water above ambient temperature.

With reference to FIG. 1, a coffee server 10 generally includes a tank or body 12 placed upon a base 13. Coffee servers 10 are well known in the commercial food service industry and are generally of a well known construction. The tank 12 is generally cylindrical and constructed of stainless steel, although other material suitable for fluid containment can be used. As one skilled in the art will recognize. The tank 12 can be of any shape, so long as it is capable of receiving and retaining or containing the beverage. In the preferred embodiment, the tank 12 has an opening 13 at the top, to allow for access into the interior. At or near the bottom of the tank 12 is an outlet port, to allow the coffee to flow out the tank 12 by gravity and be dispensed to the user. The flow of the coffee from the tank 12 is controlled by a faucet 15, the faucet 15 being in fluid communication of the outlet port 14. The faucet 15 need not be connected directly to the outlet port 14, as there may be one or more intermediate members, such as support 16 providing a conduit from the tank 12 to the faucet 15.

Figure 2:
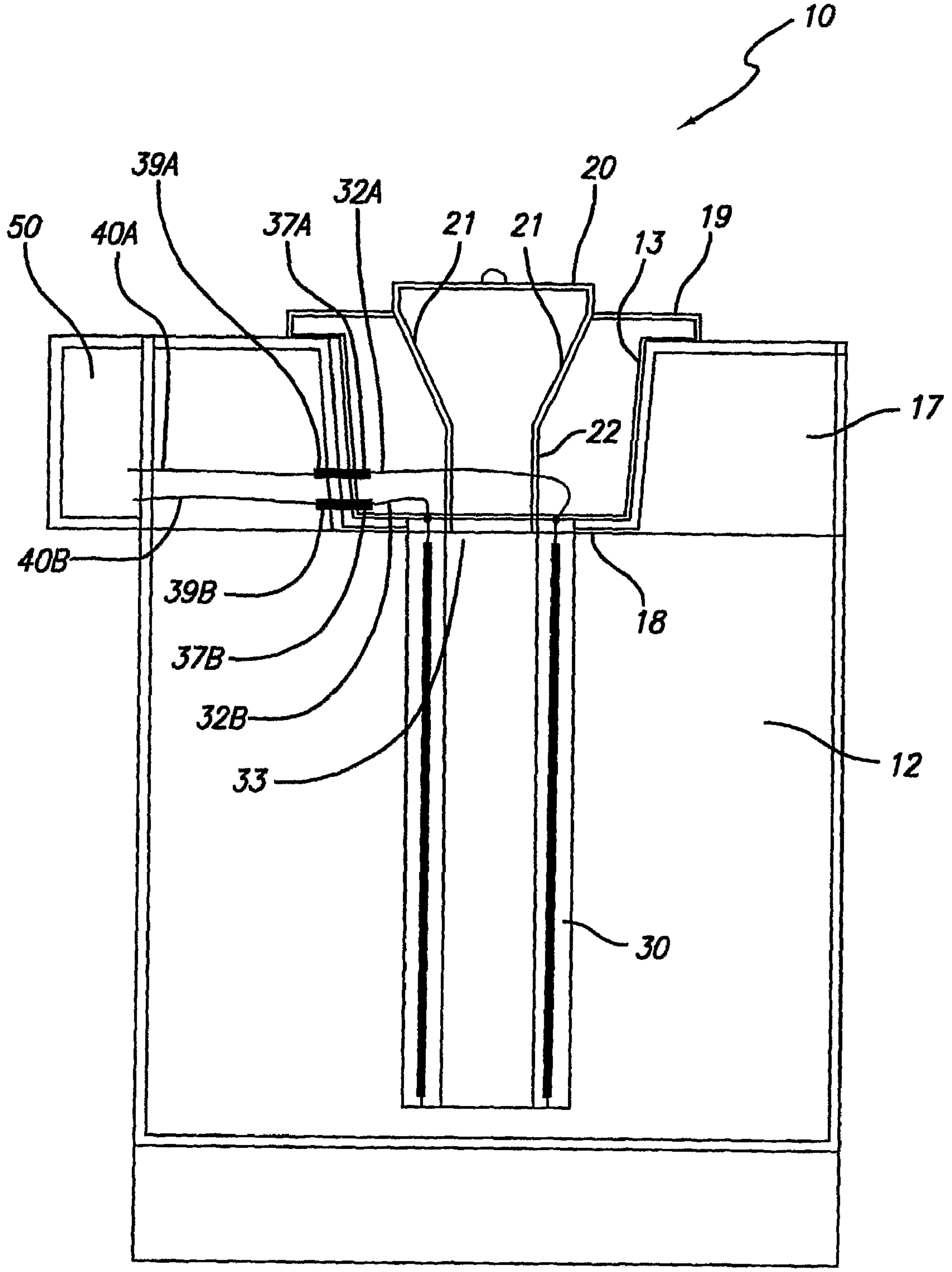
FIG. 2 is a cross sectional view of a beverage dispenser.
Figure 5:
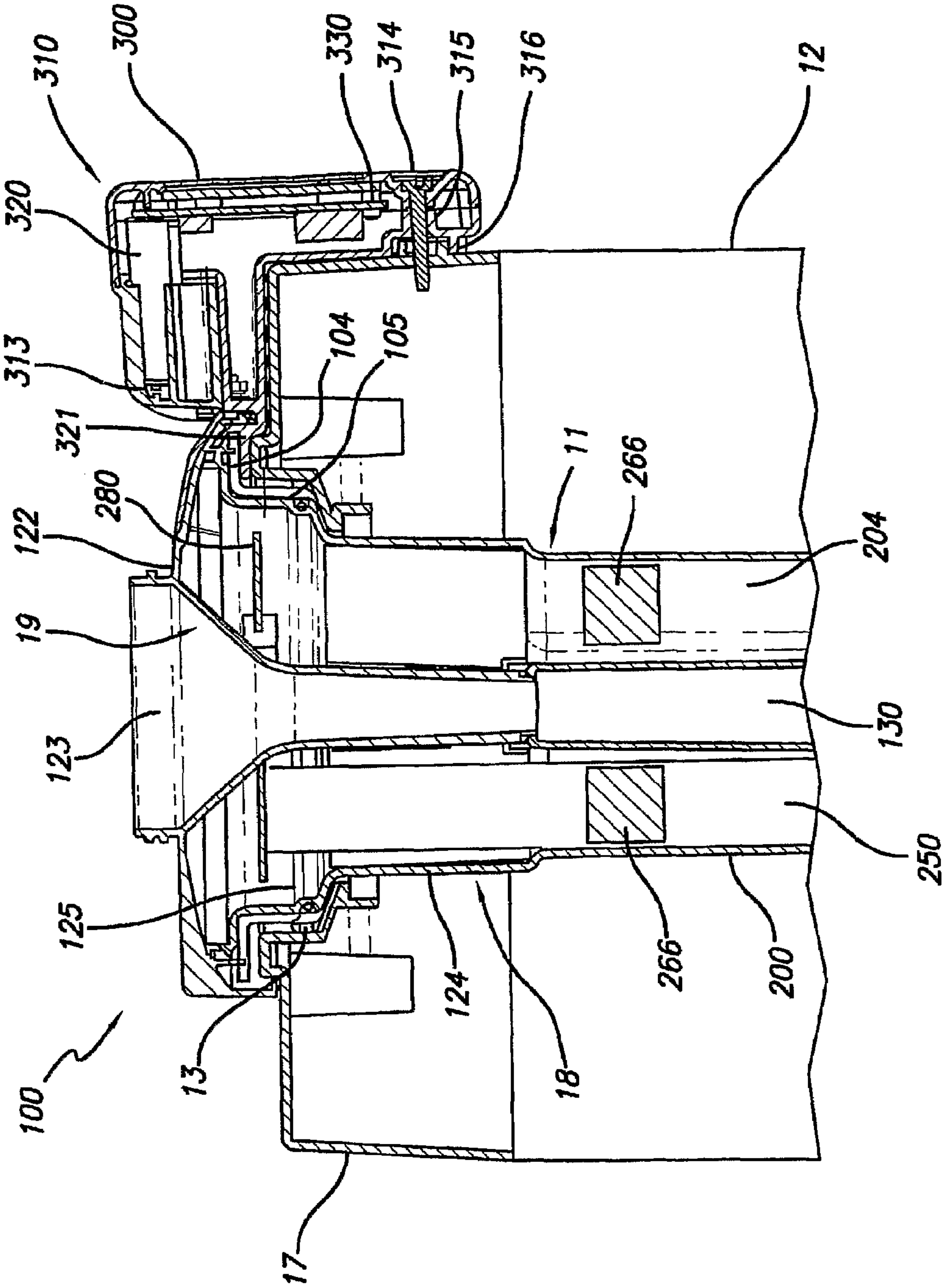
FIG. 5 is a partial sectional view of an alternate embodiment of a beverage dispenser.

As further shown in FIG. 2, the coffee server 10 is equipped with a top 17. The top 17 can be removable allowing for easy access to the interior of the tank or body 12 or the top 17 may be affixed to the tank 12, or be formed as part of the tank 12. Although the top 17 may be a solid, continuous, single piece covering the top opening of the tank, it is preferable that the top 17 include a center aperture 18 to receive additional components.

In the preferred embodiment, the top 17 is attached to the tank 12 with fasteners. The examples of suitable fasteners are threaded fasteners or rivets. The top 17 includes a center aperture 18, allowing for access into the interior of the tank 12 when the top is in place on the tank 12. The center aperture 18 may be of any convenient size. The top 17 is fitted with funnel assembly 19, occupying the center aperture 18 and providing a funnel to pour coffee or other beverage into the tank 12. The funnel assembly 19 may simply rest upon the exterior of the top 17, or as in the preferred embodiment, may fit into the aperture like a plug, the funnel assembly 19 being secured in place by the friction formed between the sides of the funnel assembly 19, and the sides of the center aperture 18. In other embodiments, the sides of the top 17 and funnel assembly 19 may be fitted with corresponding threads, allowing the lid to be screwed into securement with the top 17. In another embodiment, a bayonet style engagement may be utilized.

The funnel assembly 19 includes an open top to receive a beverage and sloping walls 21 leading to an aperture 33 allowing for access or fluid communication into the interior of the tank 12. The open top of the funnel assembly 19 may be covered by a fill cap 20. The fill cap 20 may simply cover the funnel assembly or it may be fitted as plug, extending into the open top of the funnel assembly 19. In other embodiments, the fill cap 20 may include threads, corresponding to threads fitted on the funnel assembly 19, to allow the fill cap to be screwed on and secured. A bayonet style engagement may also be utilized.

Extending from the aperture 33 to the tank 12 is fill tube 22. The fill tube 22 can be made from materials such as plastics, glass, or metal, or any other material typically used to transfer fluids. In the preferred embodiment, the lower part of the fill tube 22 is a plastic fill tube 23 forming a watertight fit to the funnel assembly 19 and fill tube 22. The plastic fill tube 23 is of sufficient length to extend from the funnel assembly 19 to near the bottom of the tank 12. The plastic fill tube 23 is surrounded by additional structure to form a capacitance probe 30. Along opposite sides of the plastic fill tube are placed capacitive plates 31A and 31B. Each capacitive plate 31A, 31B spans approximately 10° to 60° of the cylinder formed by the plastic fill tube 23. Other ranges are possible, so long as the plates 31A and 31B are not in electrical contact with one another or the beverage in the tank or container 12. Other configurations or shapes for the capacitance probe 30 are also possible. For instance, the plastic fill tube could be rectangular in cross section. In such a construction, plates 31A and 31B occupy opposite sides of the rectangle. Also, one may have multiple capacitive plates instead of a pair of plates as generally shown in FIG. 2. The capacitive plates 31A and 31B extend substantially the length of the plastic fill tube 23, although they need not extend the full length of the plastic fill tube 23. The length of the plates 31A and 31B determine the range over which the fluid level can be monitored, so their length is a function of the ranges one desires to monitor.

In the embodiment shown in FIGS. 3 and 4, a plastic tube 35 covers the plates 31A and 31B, which is generally co-extensive with the plastic fill tube 23, although it need not be co-extensive. The function of the plastic tube 35 is to provide a barrier or generally prevent contact between the coffee or other beverage and the plates 31A and 31B. Thus, the plastic tube 35 need only be co-extensive with the plates 31A and 31B, and any associated terminals or wiring on the probe assembly 30. One skilled in the art will recognize that in view of function of the plastic tube 35, other structures can be substituted. For instance, plastic could be overmolded or a silicone coating can be placed over the plates 31A and 31B to seal the plates from the coffee or other beverage.

In this regard, the apparatus and method disclosed prevents direct sensing of the beverage. The sensing using the capacitive probe as disclosed uses indirect sensing which does not physically contact the beverage. Indirect sensing seals the probe and related components from the beverage to protect the beverage and the apparatus used to sense the level of the beverage. While resistive sensing is known in the art, resistive sensing may encounter problems. Resistive sensing requires direct sensing using physical contact between the sensor, such a discrete conductive probe, and the beverage. Resistive sensing requires this physical contact or sensing relationship to directly sense the actual condition of the corresponding level of beverage. Resistive sensing can create a problem because it may be difficult to seal the conductive probe in a body and this problem is exacerbated when multiple probes are used. If the probe is not sealed, the system may be adversely affected by moisture intrusion, and/or may harbor stale beverage. Further, direct sensing using a resistive or conductive system to directly sense the actual condition of the beverage may result in accumulation of particles from the beverage on the conductive probe in contact with the beverage resulting in increased maintenance requirements.

The capacitive sensing arrangement in this disclosure eliminates the need for direct sensing of the beverage. The capacitive plates are retained in a sealed housing without the need to directly contact the beverage. The capacitive plates are protected from the possible adverse effects of contact with the beverage. Further, concerns about sealing the probe body are eliminated since there are no specific points of contact which need to be sealed such as with the resistive probes which directly sense the beverage.

At each end of the capacitance probe assembly 30, there can be space between the plastic tube 35 and the plastic fill tube 23. The space is created by the thickness of the plates 31A and 31B placed between the tubes 35 and 23. This space is sealed with a sealant 34 so as to prevent the communication of coffee or other beverage into the space. In an alternative embodiment, the plastic fill tube 23 or the plastic tube 35 are constructed with diameters that vary along their length, to accommodate the plates 31A and 31B. By such design, the spaces between the tubes at the ends are eliminated, the inside of the plastic tube 35 being in water tight contact with the outside of the plastic fill tube 23. In yet another embodiment, an adhesive is placed between the plastic tube 35 and the plastic fill tube 23.

The plastic tube 35 may extend the entire length of the plastic fill tube 22 but need only extend so long as to encase the plates 31A and 31B. In an alternate embodiment, the capacitive plates are encased with an electrically insulating material, such as silicone, rather than covered by a rigid plastic tube 35.

As shown in FIGS. 2 and 3, the plates 31A and 31B are electrically connected to the display unit 50 by suitable electrical components. In the preferred embodiment, wires 32A and 32B are in contact with plates 31A and 31B, respectively. The wires run to contacts 37A and 37B. Contacts 37A and 37B are located on the outside perimeter of funnel assembly 19, and are in opposed relationship with contacts 39A and 39B, located about the aperture of top 17.

When lid 19 is positioned on the top 17, the contacts 37A and 39A, as well as 37B and 39B, are in contact so electric signals from electrodes 31A and 31B can be transmitted from the capacitance probe assembly to a location removed from the probe 30. This construction using contacts allows the funnel assembly 19, along with the capacitance probe 30, to be removed from the coffee server 10 without the need to disconnect a wiring harness. In other words, the funnel assembly 19 and probe 30 can be removed from the server 10 separately from the display 50 which can remain attached to the server 10. Contacts 39A and 39B are electrically connected to display unit 50 by wires 40A and 40B.

In an alternate embodiment, the electric signal from the capacitance probe 30 can be transmitted to the display unit 50 using wireless technology, such as are RF or infrared transmission. In such an embodiment, a transmitter is electrically connected to the capacitance probe and a receiver is located on the display. The receiver on the display may be positioned at least one of the server and a remote location. The remote location could be located on or near the coffee server 10, such as attached to the base 13, or the support 16, or additionally or separately the display 50 could be located remote from the coffee server 10. For instance, in a convention hall setting, the coffee server 10 may be placed in a public area, such as a breakfast bar, where people serve themselves coffee. The receiver and display unit 50 could be located in an area, such as a kitchen, where food service personnel can monitor the display 50 or a series of displays, and determine when a corresponding coffee server may need to be replenished with coffee.

In an alternate embodiment, the display unit 50 is located on support 16, and occupies the position on the support 16 occupied by the sight tube of the prior art. One skilled in the art will recognize that such a mounting position allows the level sensing system described herein to be retrofitted to existing coffee servers. One skilled in the art equipped with the teachings of this disclosure will also understand how to construct a display that approximates an appearance inspired by the shape and proportions of the prior art sight tube.

Figure 6:
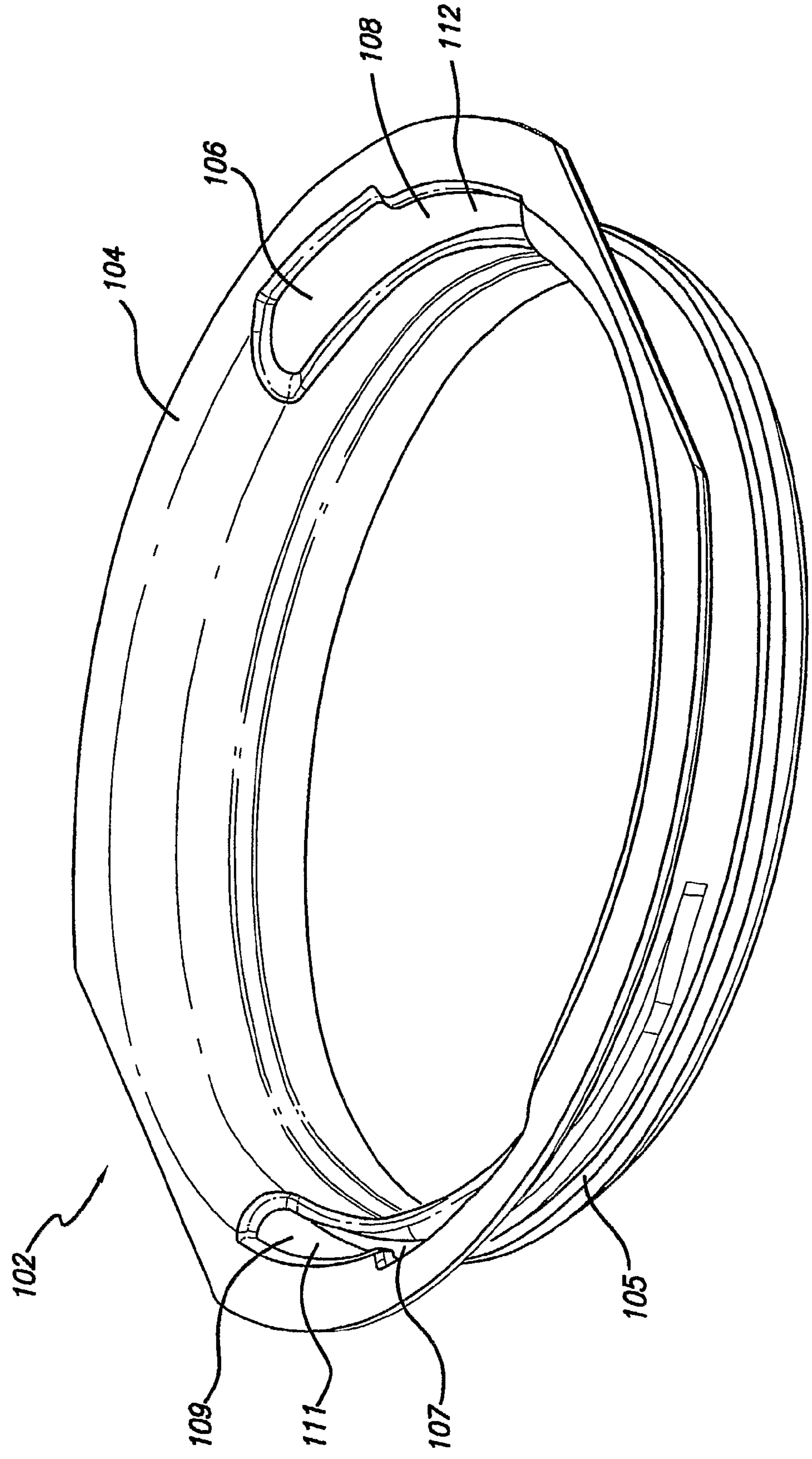
FIG. 6 is a perspective view of the retaining ring of the alternate embodiment.

In another alternate embodiment, the funnel assembly is combined with some of the electronics and the fill tube to form a level sensing assembly 100, as shown in FIGS. 5 through 12. The level sensing assembly 100 includes an upper portion 110 and a lower portion 200. The level sensing assembly 100 occupies the center aperture 18 of the top 17. The level sensing assembly 100 may fit in the center aperture 18 by friction, threads, bayonet mount, or other structures known to secure a cover, lid, or other device in or about an aperture. In the alternate embodiment shown in the figures, the level sensing assembly 100 is mated to the top 17 by a retainer shown in the form of a retaining ring 102. The retaining ring 102 shown in detail in FIG. 6, is a circular member including a flange 104 extending above the top surface of the top 17 when the retaining ring 102 is secured in the center aperture 18. The retaining ring 102 is secured in the center aperture 18 by opposing threads 105 that engage opposing threads on the walls of the top 17 forming the center aperture 18. One skilled in the art will recognize other securement structures, such as friction fitting and bayonet mounts can be used to secure the retaining ring 102 to the top 17.

Retaining ring 102 includes two bayonet apertures 108 and 109 located on the flange 104 of retaining ring 102. The bayonet apertures 108 and 109 are shaped to accept and retain bayonet tabs 118 and 119 on the exterior surface of the upper portion 110 of the level sensing assembly 100. The bayonet apertures 108 and 109 include a larger portion, such that, bayonet tabs 118 and 119 can be inserted in the larger portions, and once the bayonet tabs 118 and 119 are within the apertures 108 and 109, the level sensing assembly 100 can be rotated such that bayonet tabs 118 and 119 moved into the smaller portions 111 and 112, where the bayonet tabs 118 and 119 are secured from upward movement and are retained within the apertures 108 and 109.

The upper portion 110 of the level sensing assembly 100 includes a top portion 122, a funnel assembly 123, and an outer portion or housing 124. The funnel 123 is in fluid communication with a fill tube 130 extending through the lower portion 200. Such a construction allows coffee to be poured into the funnel 123 and exit the fill tube 130 at or near the bottom of the tank 12.

The lower portion 200 includes a plurality of hollow fins 201, 202, 203, and 204. The interior of hollow fins 201-204 are in fluid communication with the area or plenum 125 defined by the funnel 123, top 122, and outer portion 124 of the upper portion 110 of the level sensing assembly 100. The hollow fins 201-204 are not in fluid communication with the fill tube 130. In the most preferred embodiment, hollow fins are 4 in number, and arranged 90° from each other. One skilled in the art will recognize other numbers of fins may work to accomplish the claimed invention.

Figure 14:
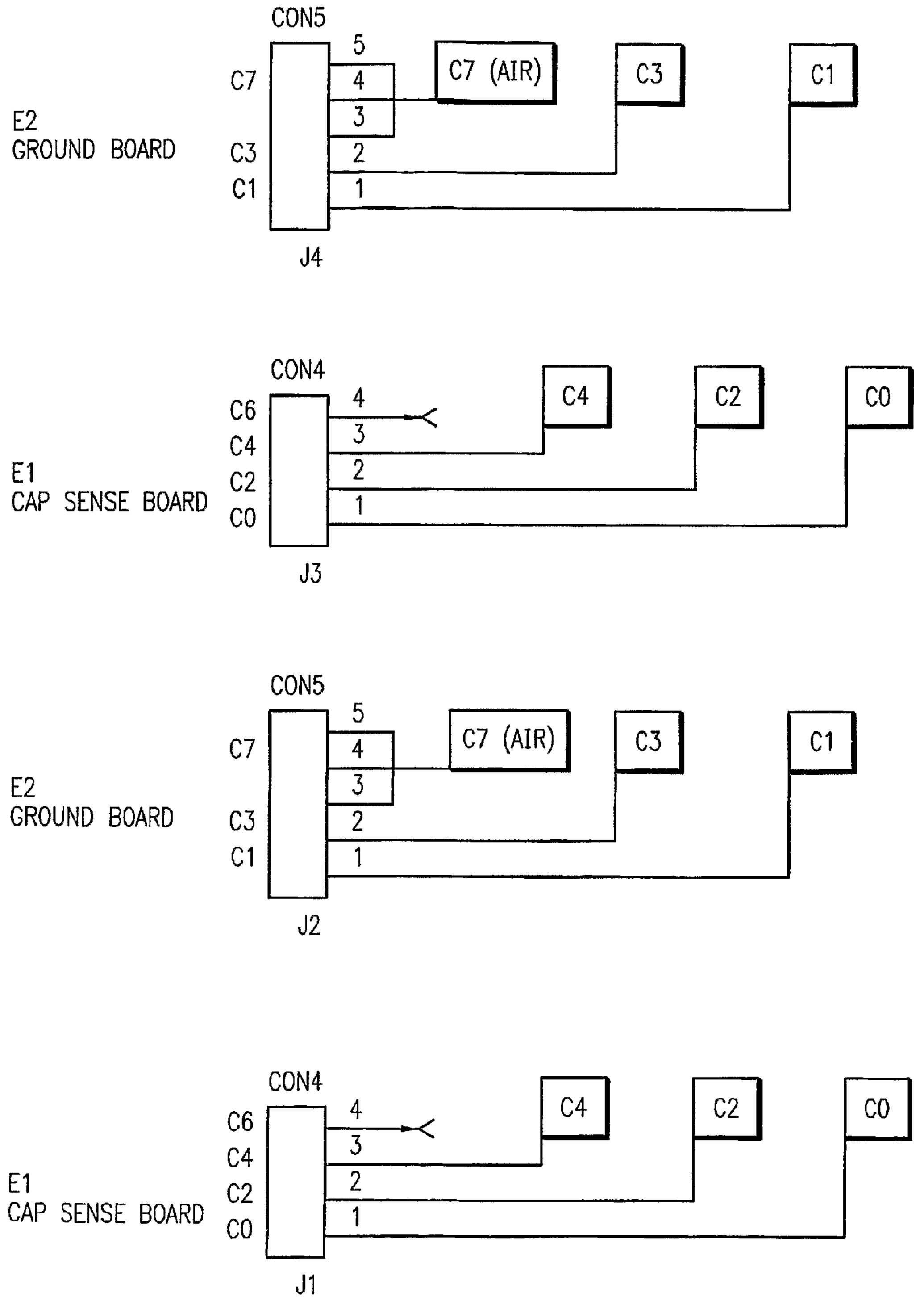
FIG. 14 is a schematic showing staggered capacitive plate positions.

Opposing hollow fins 201 and 204 house capacitive plates or electrodes, which do not directly sense and do not physically contact the beverage, for taking capacitance measurements based on the principle noted above. Opposing fins 202 and 203 are present to increase the path between the pairs of capacitive plates and fins 201 and 204, and not be hollow, since they do not need to contain any components. In alternate embodiments, each fin may include electrodes. In one such embodiment, grounding probes, consistent with the schematic shown in FIG. 14, are placed in fins 202 and 203.

In the embodiment previously described using only a pair of electrodes placed about the fill tube (shown in FIGS. 1-3), the level of beverage is determined by monitoring the capacitance between the two plates 31A and 31B. As the level of beverage changes as coffee is added or drawn by the user, the capacitance changes as well, since the dielectric of the coffee or other beverage is different than the dielectric of air. Thus, as coffee is removed from the tank 12, the amount of air indirectly sensed by the between the capacitive plates 31A and 31B increases as the amount of coffee decreases. However, with this two probe arrangement, the accuracy of the reading becomes critical, since the level of beverage is determined from the numerical value of the capacitance measurement. As oils and other contaminants build up on the probe assembly, the capacitance measured can changed when compared to a clean probe assembly. For instance, a capacitance reading which would correspond to a half filled beverage server with a clean probe assembly, may correspond to a quarter filled beverage server when a contaminated probe assembly is used. Thus, it is desirable to develop a probe assembly that is not directly dependent upon a particular capacitance value to determine the level of coffee remaining.

Figure 7:
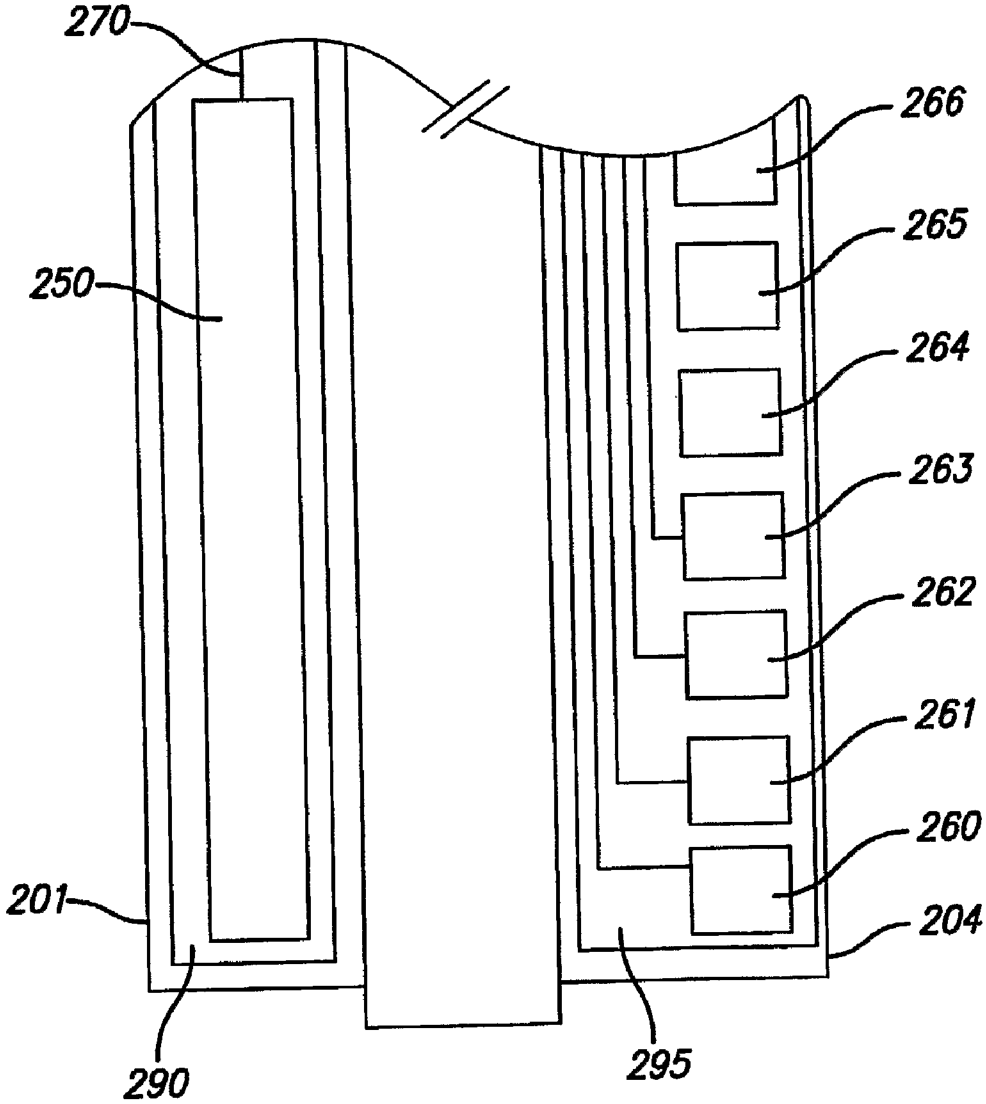
FIG. 7 is a partial sectional view of the probe assembly of the alternate embodiment showing placement of the electrodes.
Figure 8:
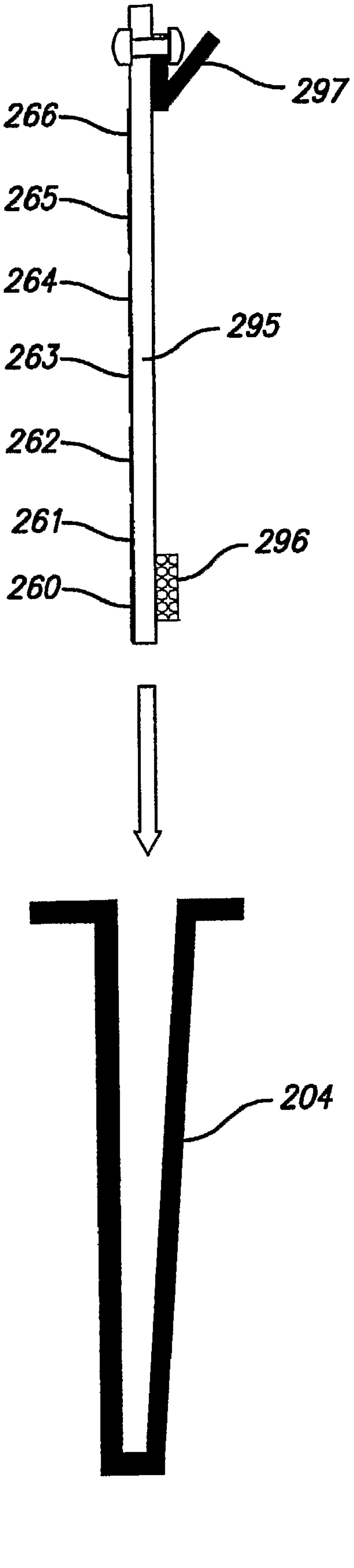
FIG. 8 is a partial cross sectional view showing placement of a circuit board within a probe assembly fin.
Figure 9:
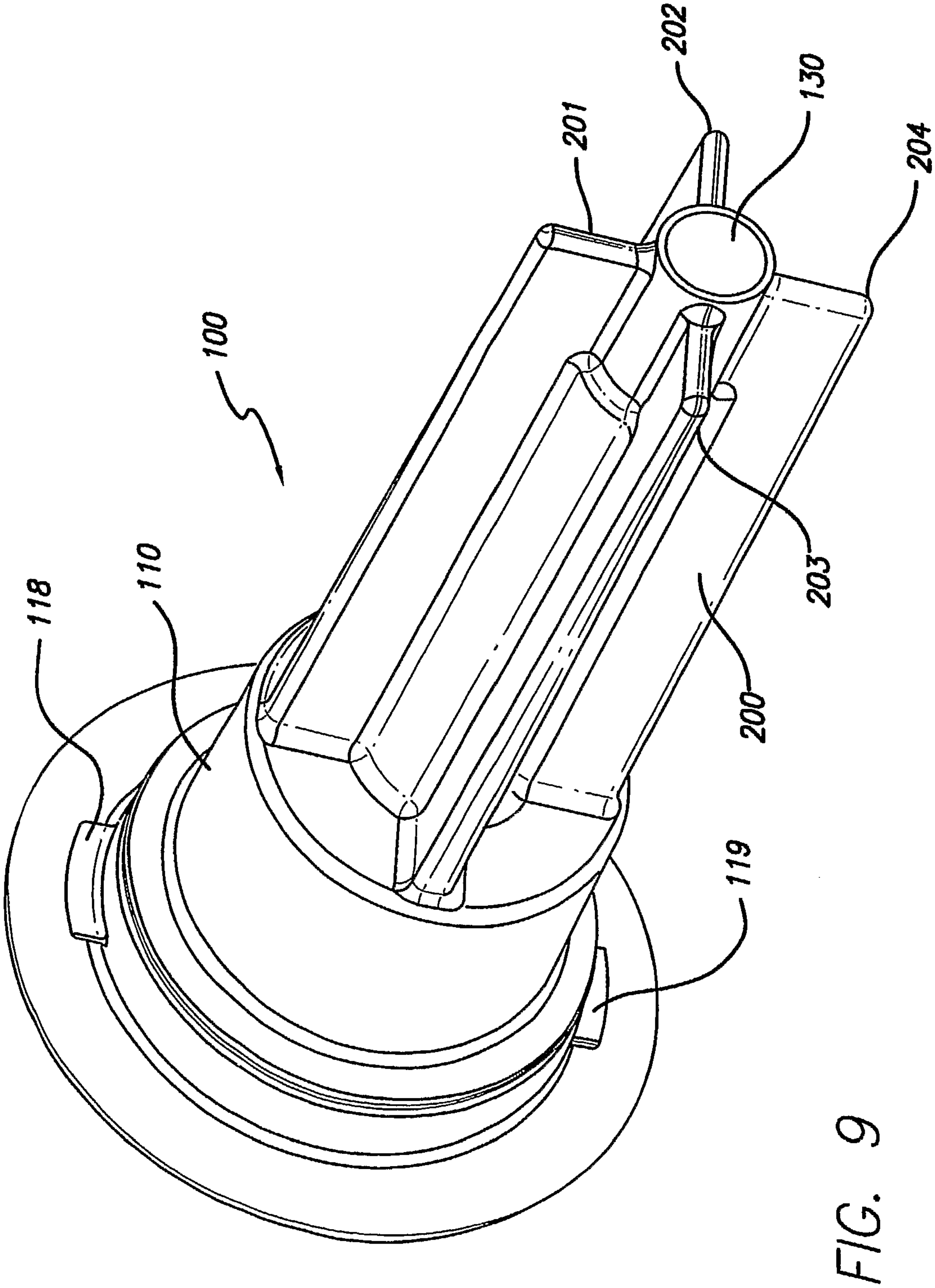
FIG. 9 is a perspective view of the probe assembly.
Figure 10:
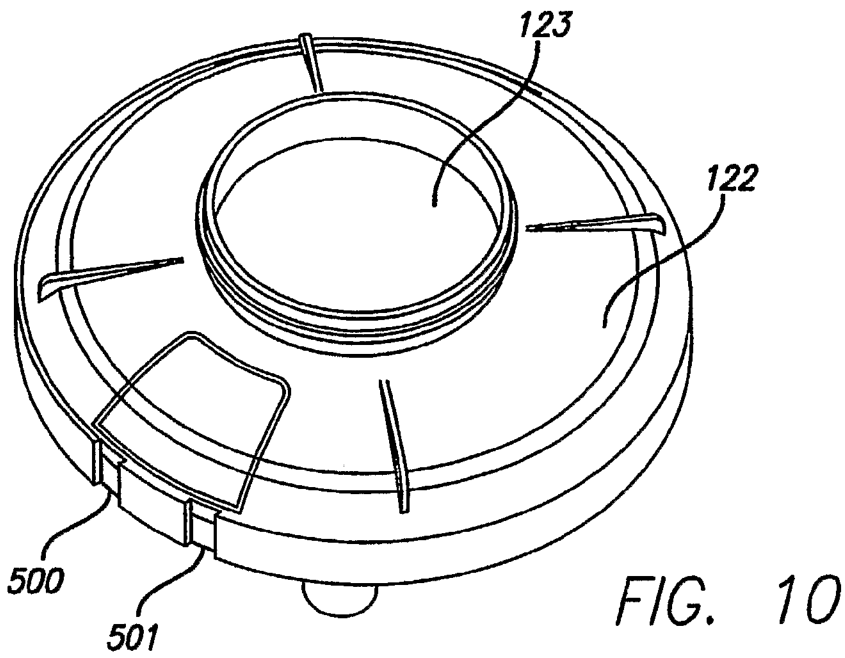
FIG. 10 is a perspective view of the top portion of the probe assembly of the alternate embodiment.
Figure 11:
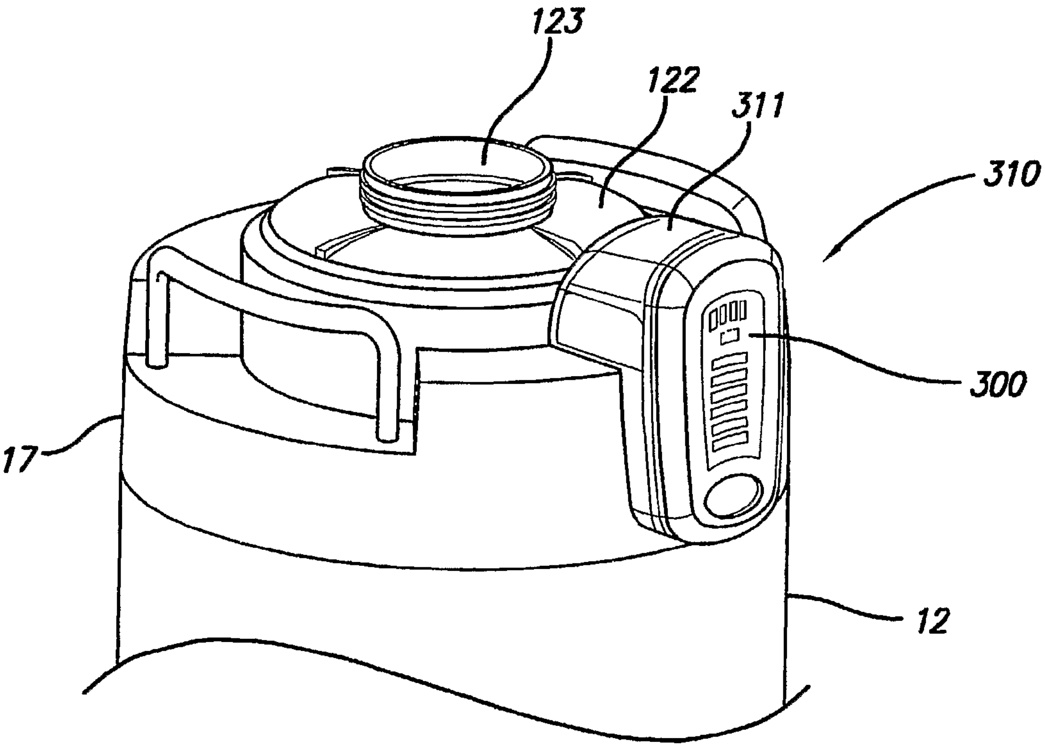
FIG. 11 is a partial perspective view of a beverage server having the probe assembly and display unit.
Figure 12:
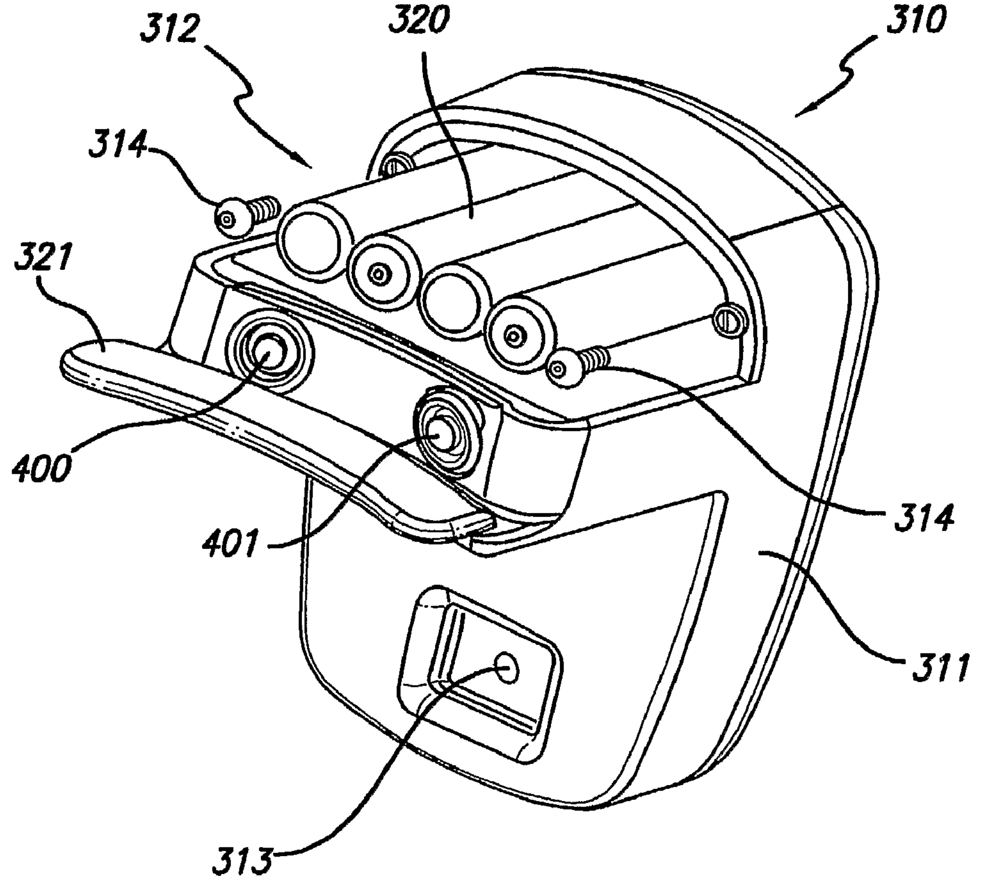
FIG. 12 is a prospective view of the display unit without the battery compartment lid.
Figure 13:
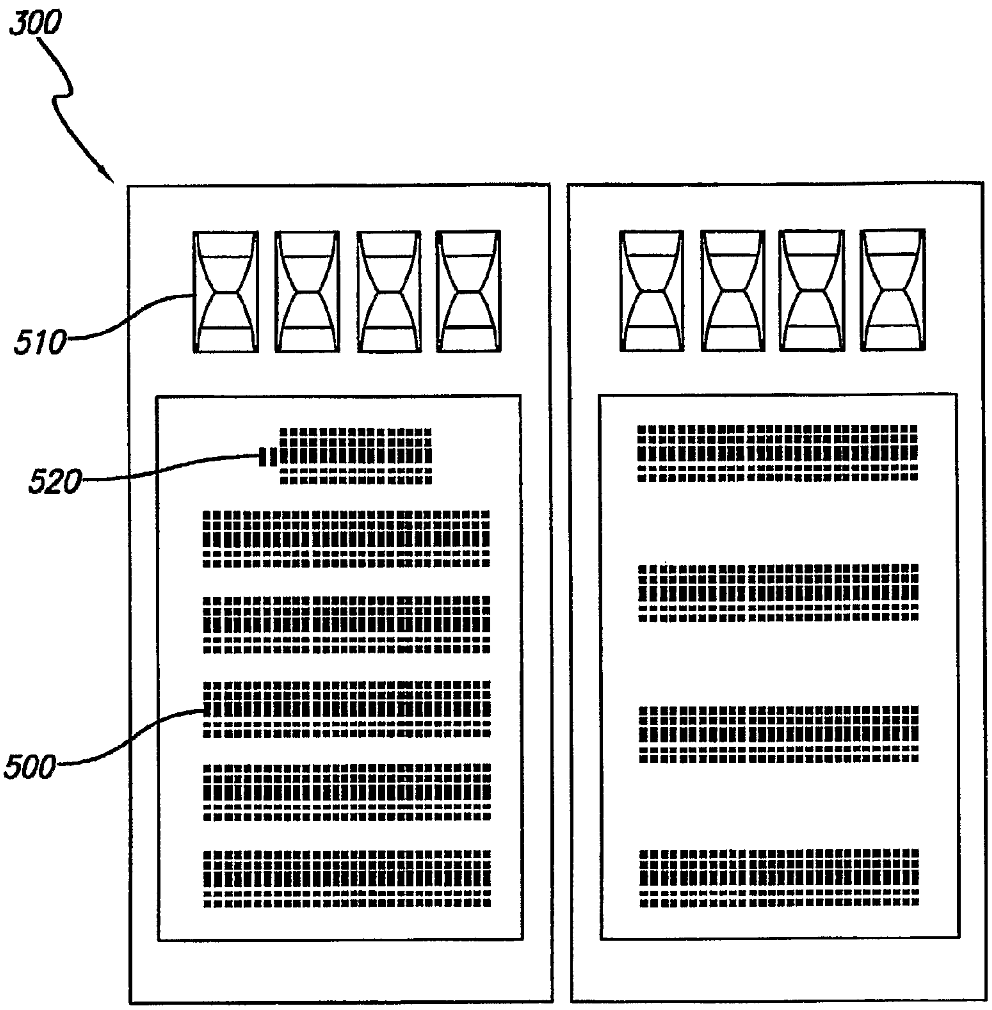
FIG. 13 is a diagram of the LCD display.

To overcome this need for accuracy, and to deal with the variations in capacitance due to factors other than the fluid level, a multi-plate approach is used. In a multi-plate embodiment as shown in FIGS. 7 and 8, a common plate or electrode 250 is placed within fin 201. Common electrode 250 runs substantially the entire length of fin 201, so as to be coupled with the entire range of beverage to be measured. It is preferable that electrode 250 is of sufficient length to cover the depth of coffee sought to be measured in the server, as the capacitance between the common electrode 250 and any of the other electrodes 260, 261, 262, 263, 264, 265 and 266 is used to determine the level of coffee, indirectly and without physical contact with the beverage. By using a plurality of electrodes, the change in capacitance sensed between the common electrode 250 and any other electrode need only be a threshold value, signifying whether coffee is present at the second electrode or not.

In such an arrangement, the sensitivity of the capacitance measurement is not as critical, since the measurement need only determine if the electrodes are at the level of coffee or not. Once the level of fluid is below the bottom of any particular electrode, the capacitance will change sufficiently, when compared to an electrode coupled to the beverage. Thus, by using a plurality of electrodes at discreet levels, a discreet level gauge can be constructed.

In the embodiment shown in FIG. 7, seven depth electrodes or probes, 260-266 are shown to monitor seven discreet levels within the server. In the preferred embodiment shown, electrode 260 is generally located at the level of the bottom of the common electrode 250. When the capacitance measured between common probe electrode 250 and electrode 260 indicates coffee is no longer at the level of the electrodes 250 and 260, the coffee server is empty, and a suitable symbol is generated on the display 300 to indicate the server is empty. When the capacitance between electrodes 250 and 261 indicates coffee is no longer at the level of electrode of 261, but the capacitance between electrodes 250 and 260 indicates coffee is still at the level of electrode 260, the display will indicate the server is one-seventh full.

Similarly, if the capacitance between electrode 250 and electrode 262 indicates the coffee is below the level of electrode 262, but still at the level of electrode 261, the display 300 will indicate the urn is two-sevenths full. Such a comparison can be used for the other electrodes in order to determine the level of the coffee. As one skilled in the art will recognize, the monitoring of the electrodes, as well as the symbols generated can be carried out in many different ways.

The electrodes 250 or 260-266 are mounted on a sensor board. In the case of the common electrodes 250, the sensor board 295 is placed in hollow fin 201. The sensor board 290 having the depth electrodes 260-266 is placed in hollow fin 204. The sensor board 295 or 290 is generally constructed of a plastic or other non-conductive material. The electrodes are copper pads approximately 1 inch by 0.75 inches and are affixed to the sensor board by adhesive. One skilled in the art will recognize the electrodes may be of other dimensions and shapes, and may be formed within the sensor board. The sensor boards either are generally standard PC boards. In the preferred embodiment, the multi electrode sensor board 295 is a multilayer sensor board. This construction allows for easier routing of electric pathways or traces, 271-274 connecting the electrode 260-266 to other components. Electric pathway 275 and 276 are not shown in FIG. 7, as they are present between the layers of the PC board 295. One skilled in the art will recognize all of the pathways could be present within the layers of the sensor board 295, or all could be on the surface, or any combination there between. Also mounted on the sensor board 290 or 295 is a foam block 296 and a leaf spring 297. The foam block 296 and leaf spring 292 may be provided to hold the electrode in contact with the fin and reduce or eliminate air pockets. The foam block 296 and leaf spring 292 also prevent or reduce the movement of the sensor board 290 or 295 within the hollow fins 201-204. One skilled in the art will recognize other springs or biasing mechanisms can be used to prevent movement of the sensor board 290 or 295 within the fins 201-204.

The electrodes 250 and 260-266 are electrically connected to terminals on a sensor unit PC board 280. The sensor unit PC board or controller 280 includes circuitry to power the electrodes 250, and 260-266, sense the capacitance between the common electrode 250 and the electrodes 260-266, a microprocessor to compare the capacitance values and determine the level of the beverage, and a communication circuit to communicate the level to a separate display assembly or display unit 310. The sensor unit controller 280 is located within the plenum 125 of the probe assembly 100. The controller 280 may also be located in the display 50.

The display unit 310 includes a housing 311, a display device in the form of an LCD display 300, a display circuit board 330, and a power supply shown in the form of batteries 320 to provide power for the entire device, including the electronics on the sensor unit PC board 280. The housing 311 has a battery compartment 312 accessed by a removable battery compartment lid 313 (not shown in FIG. 12). The battery compartment door lid 313 is attached to the housing 311 by screws 314, or other removable fasteners. The battery compartment as shown is sized to accept four AAA batteries 320. The batteries are retained in the display which is separate from and does not have any passages in communication with the probe. The separation of the power source is important to help achieve approval of the device by the National Sanitation Foundation ("NSF"). NSF rules require that all batteries be positioned out side of any food area to prevent contamination in the food areas.

The housing 311 has at least one surface for contacting the top 17. In the preferred embodiment, the housing 311 is shaped to contact both the top surface and side surface of the top 17. The housing further includes an aperture 315 for receiving a fastener 314. When the housing 311 is mounted on the top 17, the aperture 315 aligns with an aperture 316 on the lid top, allowing fastener 314 to attach the housing 311 to the lid. In the preferred embodiment, fastener 314 includes threads, the threads corresponding to threads present about the sides of aperture 316, allowing fastener 314 to be secured in aperture 316.

The housing 311 further includes a flange 321. The flange 321 extends from the housing 311 in a radial direction towards the aperture 18 in the top 17. In the preferred embodiment, the flange 321 forms part of the surface of the housing 311 contacting the top surface of the lid top. The flange is secured by the lock ring 102 when the lock ring 102 is secured to the lid top, the lock ring flange 104 restraining the housing flange 321 between the lock ring flange 104 and the top surface of the lid top 17.

The display circuit board 330 includes terminals to receive power from the batteries 320 via wires or other suitable electric pathways to the positive and negative terminals of the batteries 320. In the preferred embodiment, the batteries 320 provide at least 2.7 volts and are four AAA batteries. The display unit PC board 330 also includes terminals electrically connected to the contacts 400 and 401 on the exterior of the display unit 310. Contacts 400 and 401 are in opposing contact with contacts 500 and 501 on the exterior of the probe assembly 100 when the funnel assembly 100 and the display unit 310 are installed on the top 17. Contacts 500 and 501 are electrically connected to the sensor unit controller 280 and create an electrical connection between the PC boards. This connection further allows transmission of electrical power to the sensor unit PC board 280 and its circuitry, and the electrodes. The connection also acts as a communications channel to allow the circuitry on the sensor unit PC board 280 to communicate with the display unit PC board 310.

The probe assembly 100 is constantly powered while it is in contact with the display. Likewise, the display is constantly powered. There are no actuators or switches to turn the power on and off. Once the batteries are installed in the display the unit is powered. To conserve energy, the display will power down to a "sleep mode" after a predetermined period of time of sensing no change in beverage level. However, the sensor, once connected to the display will continue to sense the level of beverage. the sensor assembly may reduce the frequency of sensing in response to extended non-use. Once a change in level is sensed, the display and sensor assembly "wake up" and return to full service.

The LCD display 300 is positioned on the display unit housing 311 so that the information displayed is visible to a user or attendant. The LCD display 300 includes a bar graph 500 or other indicator, to show the amount of coffee left in the server 10. In the preferred embodiment, a 6 segment bar graph is used. One skilled in the art will recognize that the number of bars used can vary, depending upon the container size and user preference of the number of levels to be monitored. The display 300 also includes four hourglass symbols 510, or other indicator, to display information regarding how long since the server 10 was refilled. Each hourglass symbol represents one hour. Each hourglass symbol is divided into four parts, thus allowing the symbols to represent quarter hour increments. The display 300 also includes a symbol 520 for indicating when the batteries need to be replaced. The battery symbol can also be used to indicate that a battery test is being performed.

In operation, the invention described herein preferably follows the operation protocol outlined below.

Display Unit:

LCD—run by internal hardware—only seg's need be set—2 mux (provision for more)

Unit runs a 1 second cycle—is usually in a low power mode (LPM3) with power to Sensor—awakes & requests Com from Sensor by dropping the power line to Sensor low (thru. 1M) (see Com below)

Buzzer—currently has internal freq. circuitry, needs to be pulsed at 1 sec interval—switched when Display wakes up—does 3 pulses on the hour if coffee is over the set time—does 5 pulses at set time 1 rotary octal switch-3 bits set coffee timer length 000=none, 001=1 hr, 010=2 hr, 011=3 hr or 100+=4 hours—buzzer buzzes at time and following hours unless empty (up to some limit)

Display unit to detect when unit is refilled and start the timer

JTAG

Bootstrap header

Battery test—flashes battery symbol (part of top bar)—nominally when battery is 3.3 volts LCD—shows 4-6 LCD bars & outside line, top bar has an imbedded battery symbol, there are 4 hour glasses broken into 4 quarters indicating freshness of coffee from 0 to 4 hours Watch dog to be used Display unit powers down when not needed for 1 sec. and wakes up from Basic Timer1

Uses a 32768 Hz xtal for timing, int. osc. for inst's nominally

Provision is made for 3 option jumpers testable at the same time as the timer setting Bootstrap is also attached to the power/com lines Unit powers on at battery insertion using [possibly brown out 1.9 volts] separate 2.7v reset ckt, unit sets LCD up, checks for timer setting, and powers the Sensor unit. At 2 second interval it queries the Sensor unit for level then goes to sleep for another second. Keeps track of time from an empty to full level (or Sensor attachment that shows non-empty), sets ¼ hour hourglass segments in the LCD and beeps at the set time unless set time is zero. Beeps every hour after that unless the level is zero. Buzzer is turned on/off at 1 sec. wakeups. LCD is set at wakeup after new info. is obtained from the Sensor. An empty unit has no hourglasses on, & the hourglasses get reset only with an empty. The unit never gets turned off. The LCD will show only the bar ring which will flash if there is no Sensor attached for some length of time then quit. An error signal from the Sensor that continues for 10 Coms will show all bars flashing—this is defeatable with a jumper.

Sensor Unit:

Comm to Display (see Com below)

Capacitive sensing—pos & neg

JTAG

Usually in low power mode—wakeup on time or interrupt—nominally 1 sec

Display starts a Com & the Sensor unit does a conversion after sending current data—for power savings it may only do a conversion after a request After a conversion the unit goes to LPM3 mode (low power)

Watch dog to be used

Provision is made for up to 2 'jumper' options—one possibly for 1 gal vs. 1.5 gal units Bootstrap is also attached to the power/com lines—TBD on it's function The sensor unit is on when power is supplied from the Display which is continuous except for Com or lack of a Sensor unit. It stores power to communicate when the power line voltage is dropped briefly. After a Com sequence the Sensor micro reads the capacitance & calculates levels and the next response. It then sleeps until interrupted & awakened for Com. It can be reset if the Display holds power low long enough.

Communication:

- Display holds the Com line high thru. 1 k ohm R normally
- Display starts Com by pulling the Com/power line low. It makes the 1 k ohm high output an input (float), makes the 1M input a low output signaling get data—low is an interrupt to the Sensor (unit)
- Display pulses low four times & during each low the Sensor pulls the line high if data is a pos. data bit. Display pulls low with 1 k (~40 uS) holds the low with a 1M & the Sensor pulls high with 10 k (~400 uS rise). Display then drops the line low with 10 k (~40 uS) & Sensor drops it then pulls high if nec. (another 400 uS). After the sequence (~1760 uS=<2 mS) the Display pulls high with 1 k to supply full power to Sensor again. (0.0396 uA ave. used)
- Protocol—hex—4 bits can be sent during the cycle—0 is no Sensor unit, 1 is empty, 2 is lowest bar, 3 is 2 1 gal bars, 4 is 3 1 gal bars, 5 is 4 1 gal bars, 6 is 2 1.5 gal bars, 7 is 3 1.5 gal bars, 8 is 4 1.5 gal bars, 9 is 5 1.5 gal bars, 10 is 6 1.5 gal bars, 11 is error, 12-15 TBD.
- Com is started by Display by dropping the power—Sensor has an interrupt that has it send data. (Sensor can't start Com.)
- Com is done on the same 1 second (or other) basis as other operations.

Additionally, the flow charts, shown in FIGS. 15-33, further describe the operation of the invention.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. It is envisioned that those skilled in the art may devise various modifications and equivalents without departing from the spirit and scope of the disclosure as recited in the following combinations. Further, this application is intended to cover such departures from the present disclosure as come within the known or customary practice within the art to which it pertains.

The invention claimed is:

1. A level sensing apparatus for use with a beverage server having a body for receiving and retaining beverage, an opening in the body, the level sensing apparatus comprising:

- a housing having a wall defining at least one chamber therein, the housing being disposable in the opening of the body of the server;
- a funnel assembly associated with the housing, the funnel assembly configured to receive beverage there through for dispensing into the serving;
- at least one capacitive sensing probe assembly retained in the housing for indirectly sensing at least one level of beverage retained in the beverage server;
- a separate display assembly selectively couplable to the at least one capacitive sensing probe assembly;
- a power source coupled to the display assembly and to the capacitive sensing probe assembly; and
- a retainer configured for operatively coupling the housing and funnel assembly with the display assembly to the server.

2. The level sensing apparatus of claim 1, wherein the capacitive sensing probe assembly further comprising at least a pair of spaced apart capacitive plates, an electric field defined between the plates for indirectly sensing a change in materials in the electric field.

3. The level sensing apparatus of claim 2, wherein at least one of the capacitive sensing probe assemblies further comprising multiple in spaced apart capacitive plates for sensing multiple levels of beverage in the server.

4. The level sensing apparatus of claim 1, wherein the at least one capacitive sensing probe assemblies is configured for constantly sensing.

5. The level sensing apparatus of claim 1, wherein the at least one capacitive sensing probe assemblies is configured for constantly sensing and the display assembly is configured to time out after a predetermined period of time.

6. The level sensing apparatus of claim 5, wherein the capacitive sensing probe assembly and display assembly are configured to start up when level of beverage in the server changes a predetermined quantity.

7. The level sensing apparatus of claim 1, wherein the power source is positioned completely external to the server body.

8. The level sensing apparatus of claim 1, wherein the power source is positioned in the display assembly.

9. The level sensing apparatus of claim 8, wherein the power source is positioned in the display assembly and the display assembly is positioned completely external to the server body.

10. The level sensing apparatus of claim 1, wherein the power source is provided in the form of replaceable batteries.

11. The level sensing apparatus of claim 1, wherein the capacitive sensing probe assembly selectively couplable to the server for indirectly sensing beverage dispensed into the server; the display assembly being selectively couplable to the server; a wireless transmitter carried on the probe and a wireless receiver carried on server; the wireless transmitter producing a signal received by the wireless transmitter.

12. The level sensing apparatus of claim 1, further comprising the at least one capacitive sensing probe assembly being selectively couplable to a server for indirectly sensing beverage dispensed into the server; at least one display assembly being at least one of selectively couplable to the server and spaced from the server; a wireless transmitter carried on the probe and a wireless receiver carried on server; the wireless transmitter producing a beverage level signal received by a corresponding one of the at least one wireless transmitter.

13. The level sensing apparatus of claim 1, further comprising the at least one capacitive sensing probe assembly being selectively couplable to a server for indirectly sensing beverage dispensed into the server; multiple display assemblies being positioned spaced from the server, one of the display assemblies being selectively couplable to the server; a wireless transmitter carried on the capacitive sensing probe assembly and a wireless receiver carried on a corresponding server; the wireless transmitter producing a signal received by a corresponding one of the at least one wireless transmitter.

14. A level sensing apparatus for use with a beverage server having a body for receiving and retaining beverage, an opening in the body, the level sensing apparatus comprising:

at least one capacitive sensing probe assembly retained in a housing to provide a barrier against contact with beverage, the housing containing the capacitive sensing probe assembly being disposable into the opening in the body of the server, the capacitive sensing probe indirectly sensing at least one level of beverage retained in the beverage server;

a separate display assembly selectively couplable to the at least one capacitive sensing probe assembly;

a power source coupled to the display assembly and to the capacitive sensing probe assembly.

15. The level sensing apparatus of claim 14, further comprising a retainer configured for operatively coupling the housing with the display assembly to the server.

16. The level sensing apparatus of claim 14, wherein the capacitive sensing probe assembly further comprising at least a pair of spaced apart capacitive plates, an electric field defined between the plates for indirectly sensing a change in materials in the electric field.

17. The level sensing apparatus of claim 16, wherein at least one of the capacitive sensing probe assemblies further comprising multiple in spaced apart capacitive plates for sensing multiple levels of beverage in the server.

18. The level sensing apparatus of claim 14, wherein the at least one capacitive sensing probe assemblies is configured for constantly sensing.

19. The level sensing apparatus of claim 14, wherein the at least one capacitive sensing probe assemblies is configured for constantly sensing and the display assembly is configured to time out after a predetermined period of time.

20. The level sensing apparatus of claim 19, wherein the capacitive sensing probe assembly and display assembly are configured to start up when level of beverage in the server changes a predetermined quantity.

21. The level sensing apparatus of claim 14, wherein the power source is positioned completely external to the server body.

22. The level sensing apparatus of claim 14, wherein the power source is positioned in the display assembly.

23. The level sensing apparatus of claim 22, wherein the power source is positioned in the display assembly and the display assembly is positioned completely external to the server body.

24. The level sensing apparatus of claim 14, wherein the power source is provided in the form of replaceable batteries.

25. The level sensing apparatus of claim 14, wherein the capacitive sensing probe assembly selectively couplable to the server for indirectly sensing beverage dispensed into the server; the display assembly being selectively couplable to the server; a wireless transmitter carried on the probe and a wireless receiver carried on server; the wireless transmitter producing a signal received by the wireless transmitter.

26. The level sensing apparatus of claim 14, further comprising the at least one capacitive sensing probe assembly being selectively couplable to a server for indirectly sensing beverage dispensed into the server; at least one display assembly being at least one of selectively couplable to the server and spaced from the server; a wireless transmitter carried on the probe and a wireless receiver carried on server; the wireless transmitter producing a beverage level signal received by a corresponding one of the at least one wireless transmitter.

27. The level sensing apparatus of claim 14, further comprising the at least one capacitive sensing probe assembly being selectively couplable to a server for indirectly sensing beverage dispensed into the server; multiple display assemblies being positioned spaced from the server, one of the display assemblies being selectively couplable to the server; a wireless transmitter carried on the capacitive sensing probe assembly and a wireless receiver carried on a corresponding server; the wireless transmitter producing a signal received by a corresponding one of the at least one wireless transmitter.

* * * * *